C. M. CULBERTSON.
ATTACHMENT FOR VEHICLES.
APPLICATION FILED SEPT. 13, 1910.
996,749.
Patented July 4, 1911.
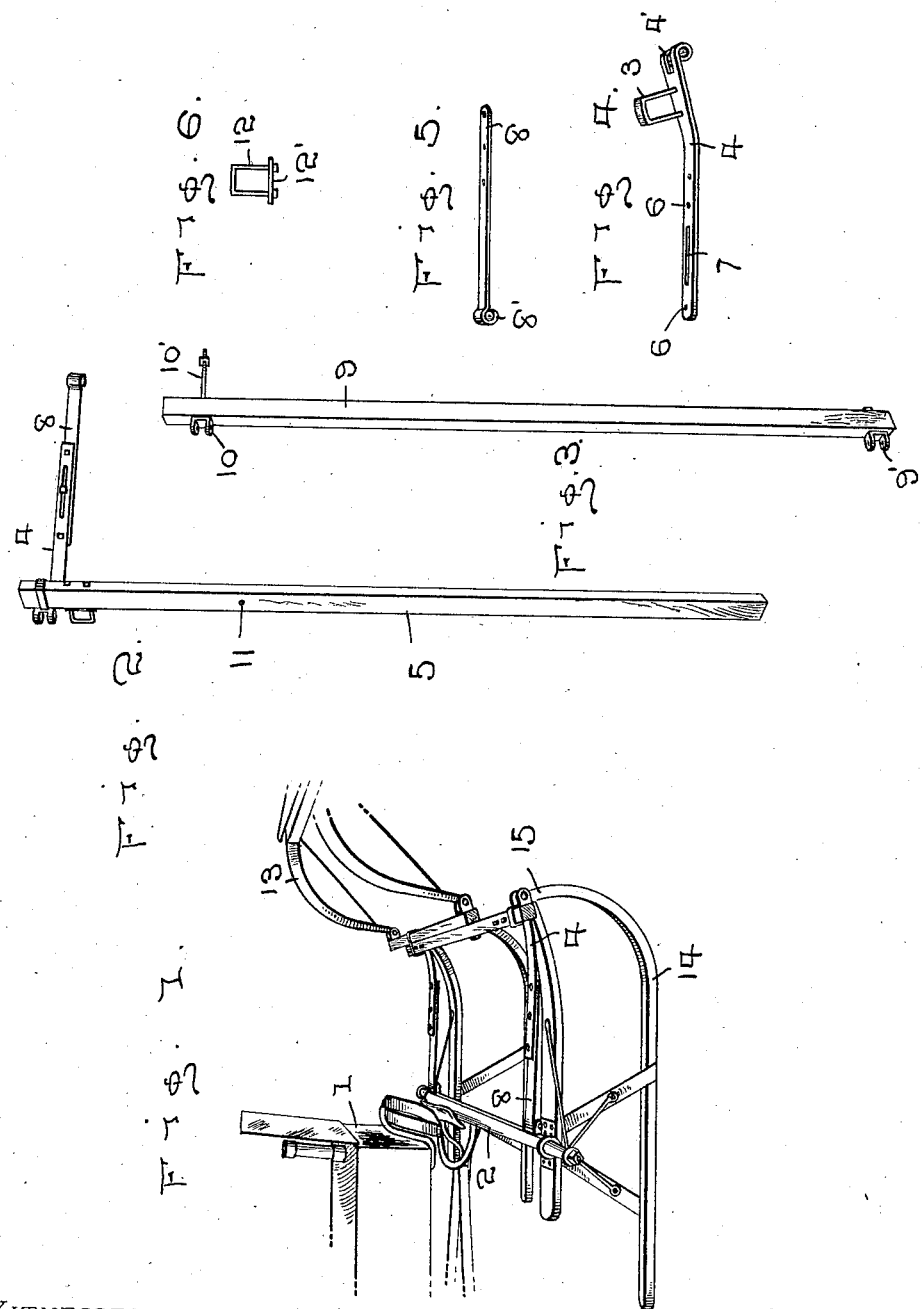
WITNESSES:
INVENTOR
C. M. Culbertson
BY
W. J. Fitzgerald & Co.
Attorneys

UNITED STATES PATENT OFFICE.

CHARLES M. CULBERTSON, OF CARPENTER, IOWA.

ATTACHMENT FOR VEHICLES.

996,749. Specification of Letters Patent. Patented July 4, 1911.

Application filed September 13, 1910. Serial No. 581,900.

*To all whom it may concern:*

Be it known that I, CHARLES M. CULBERTSON, a citizen of the United States, residing at Carpenter, in the county of Mitchell and State of Iowa, have invented certain new and useful Improvements in Attachments for Vehicles; and I do hereby declare the following to be a full, clear, and exact description of the invention, such as will enable others skilled in the art to which it appertains to make and use the same.

This invention relates to a new and useful form of bob-sleigh attachment for vehicles, and the object is to attach the thills or pole of the vehicle in such a way that the runners will be held in alinement and prevented from rooting into drifts.

With this and other objects in view the invention consists of the construction, arrangement and combination of parts described hereinafter and shown in the accompanying drawings which form a part of this application.

Referring to the drawings, Figure 1 represents a perspective view of my attachment applied to a vehicle. Fig. 2 is a detail view of a transverse runner brace. Fig. 3 is a detail view of the shaft cross bar carrying the thill couplings. Fig. 4 is a detail view of an auxiliary rave-brace. Fig. 5 is another portion of the same, and, Fig. 6 represents a clip for attaching the two transverse bars together.

In the drawing, in which similar reference numerals designate corresponding parts throughout the several views, 1 is the body of a vehicle, 2 is the front axle thereof, and 14 is a sled runner constructed in the usual manner, consisting of a runner proper, rave, braces and some form of pivotal bearing for attachment to the end of the axle. The point 15 of the runner has an opening therethrough by which is attached, by some suitable fastening such as a bolt, the end 4' of the rave-brace 4. Adjacent this end is a clip 3, secured to the brace and adapted to form a fastening for the transverse runner-brace 5. The other end of the rave-brace is provided with bolt holes 6 and a slot 7 for the purpose of forming a longitudinally adjustable fastening with the other section of the brace 8, the end of which 8' is pivotally secured to the axle by the ordinary thill coupling, not shown. It will thus be seen that the draft has been transferred from the thill coupling to the transverse bar 5 connecting the two runner points. To this bar is attached the shaft cross bar 9, which carries the second set of thill couplings 9' and 10. The thill coupling 10 is provided with a stem 10' extending through the bar and having a threaded end with a nut adapted to engage the same. This stem is passed through a bolt hole 11 in the bar 5 and a nut being set up upon the end, the two bars are securely held together at this point.

On the farther end of the bar 5 a clip 12 is mounted, said clip being a U-shaped member with threaded ends, having a cross plate 12' adapted to serve as a clamp by screwing down nuts on the threaded stems of 12. The bar 9 is thus clamped to the bar 5, and, since the stem 10' of the thill coupling 10 prevents any lateral motion, the two bars constitute to all intents and purposes a single structure. On the thill couplings 9' and 10 are secured thills 13 of the usual form, and by forming a number of spaced bolt holes in the bar 5 it is possible to offset the thills any desired distance, or to aline them centrally at will. It will be seen that while the runners 14 are still free to oscillate or pivot about the shaft to the degree necessary for passing over rough or uneven ground, the attachment of the thills 13 to the points of the runners prevents the latter from rooting into drifts and holes, and, further the rigid alinement of the runners enforced by the transverse bar at their points insures perfect tracking and consequent minimum draft.

Although I have shown my attachment adapted to single shafts, it will be readily recognized that a pole can be used instead with equal success. And further, if so desired the bar 9 may be omitted, the thill couplings being placed directly on the bar 5, which will simplify the construction at the expense of the possibility of offsetting the thills.

What I claim is:

In combination, a pair of runners provided with means on their rear ends for pivotal attachment to the front axle of a vehicle, a pair of brace members pivotally connected to the forward ends of the runners, brace members adjustably connected to said first brace members and adapted to be connected to the front axle, clips secured to the first brace members, and a transverse runner brace secured to the clips.

In testimony whereof I have signed my name to this specification in the presence of two subscribing witnesses.

CHARLES M. CULBERTSON.

Witnesses:
G. H. LUBIENS,
GEO. McGILLIWAY.

Copies of this patent may be obtained for five cents each, by addressing the "Commissioner of Patents, Washington, D. C."